United States Patent Office 2,802,023

Patented Aug. 6, 1957

2,802,023

PROCESS OF PREPARING GLYCOL DIESTERS FROM EPOXIDES

Merrell R. Fenske and Jennings H. Jones, State College, Pa., assignors to Esso Research and Engineering Company, a corporation of Delaware No Drawing. Application May 7, 1954, Serial No. 428,376

7 Claims. (Cl. 260—487)

This invention relates to the esterification of epoxides with perfluorinated carboxylic anhydrides and to the conversion of the resulting esters into other useful compounds. In one of its more specific aspects the invention relates to the reaction of a tetrahydrofuran such as 2,5-dimethyl tetrahydrofuran with a perfluoroacid anhydride such as trifluoroacetic anhydride and the conversion of the resulting diester into a glycol.

This application is a continuation-in-part of application Serial No. 387,522, filed October 21, 1953.

In recent times increasing amounts of various epoxides or cyclic ethers have become available from reactions involving controlled vapor phase oxidation of hydrocarbons. Tetrahydrofuran and methyltetrahydrofuran can also be obtained from furfural. Still other cyclic ethers can be obtained from various aldol reactions. At the same time glycols of various sorts have been in increasing demand because of their special solvent characteristics and also because of their ability to form high molecular weight resins by condensation with a variety of other bifunctional compounds such as dibasic acids, amines and the like.

It is an object of the present invention to provide an efficient method for converting epoxides into glycols by way of intermediate ester formation. Another object is to convert epoxides into glycols in a process allowing ready recovery of the reagent acid from the intermediate diesters. These and other objects, as well as the nature, advantages and operation of the invention, will become more clearly apparent from the subsequent description.

A peculiar property has now been discovered in anhydrides of perfluorocarboxylic acids, that is, carboxylic acid anhydrides having all hydrogen atoms replaced by fluorine. Specifically it has been found that such acid anhydrides have the ability to react with saturated epoxides, thereby forming a high yield of the diester of the perfluoroacid and only a very small amount of unwanted by-products. In particular it has been discovered that anhydrides of perfluoroaliphatic carboxylic acids of 2 to 6 carbon atoms such as trifluoroacetic, pentafluoropropionic, heptafluorobutyric and similar acids can be cleanly reacted with the saturated cyclic ethers to form diesters, which in turn can be readily converted into the corresponding glycols and the perfluoroacid by alcoholysis or saponification, or even direct hydrolysis in the case of the more reactive compounds. The fluoroacid anhydrides differ fundamentally from acetic anhydride and other anhydrides heretofore used for epoxide ring scission in that the previously used reagents tended to give as a great a yield of the unsaturated monoester as of the desired diester, whereas the fluoroacid anhydrides are quite selective in producing the diester. Another advantage in favor of the present invention is that the perfluoroacid anhydrides require less severe reaction conditions, that is, lower temperatures and pressures, than the agents heretofore used for this type of reaction.

While the invention has been described above as being particularly applicable to saturated epoxides, useful compounds can also be obtained by reacting the fluoroanhydrides with unsaturated epoxides. However, in such a case the ring opening will be accompanied by addition to the double bond and also polymerization of the conjugated diolefin. Consequently, unsaturated epoxides tend to produce rather complex compounds.

Furthermore, while the invention is particularly useful in connection with the monobasic acid anhydrides described above, a reaction can also be obtained with dibasic acid anhydrides such as tetrafluorosuccinic acid anhydride. However, this may be less desirable for many purposes since polymeric materials tend to be produced.

The invention is particularly applicable to saturated cyclic ethers or epoxides having a tetra- or pentamethylene oxide ring. The invention is also readily applicable to epoxides having only three- or four-membered rings such as ethylene oxide, 1,2-epoxy-butane, 2,3-epoxy-butane, 1,3-epoxy-propane or trimethylene oxide, 2-ethyl-1,3-epoxy-propane, 2,4-epoxy-pentane, 2,4-epoxy-octane and the like. However, most of these epoxides having rings of less than five members can be easily hydrolyzed to glycols directly with conventional sulfuric, perchloric or p-toluenesulfonic acid. Consequently, the use of perfluoroacids is not normally essential in producing glycol molecules having the hydroxyl groups separated from each other by not more than three carbon atoms.

Thus the invention is particularly effective with epoxides having a tetrahydrofuran or a tetrahydropyran ring. In other words, the epoxides or cyclic ethers useful in the present invention may be represented by the formula

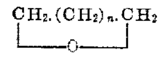

wherein $n$ is an integer equal to 2 or 3 and wherein one, several, or all of the hydrogen atoms of the alkylene oxide ring may be substituted by alkyl groups of 1 to 15 carbon atoms. Of course, if the ring is substituted by too many long-chain alkyl radicals, particularly by branched ones, steric effects may hinder the ring opening. Accordingly, compounds having not more than one to three alkyl substituents of 1 to 3 carbon atoms each are particularly preferred. However, still other epoxy compounds such as those having chlorine, bromine or other halogen substituents, or those containing carboxylic acid or carbalkoxy radicals can also be used.

Examples of such compounds having a total of 4 to 16 carbon atoms per molecule include tetrahydrofuran, 2-methyl tetrahydrofuran, 2,5-dimethyl tetrahydrofuran, 2,5-dichlorotetrahydrofuran, 2-methyl-5-ethyl tetrahydrofuran, 2-propyl tetrahydrofuran, 2,3,4,5-tetramethyl tetrahydrofuran, 2,2,4,4-tetramethyl tetrahydrofuran, 2,2,4-trimethyl tetrahydrofuran, 2,2,4-trimethyl-5-propyl tetrahydrofuran, 2,2,5-triethyl tetrahydrofuran, 2-methyl-5-undecyl tetrahydrofuran, 2-methyl-5-carboxyl tetrahydrofuran, tetrahydrofuryl propionic acid, tetrahydropyran, 2-methyl-6-propyl tetrahydropyran, 2,6-diethyl tetrahydropyran, 2,5-dicarbethoxy tetrahydropyran and so forth.

Furthermore, the reaction may be applied to the opening of analogous ring structures such as tetrahydrothiophene and its homologues and derivatives of the type described above, in which case the thiophene ring is opened and converted into a hydroxymercaptan compound.

In carrying out the reaction it is desirable to use at least one and preferably 1.5 to 2 moles of perfluoroacid anhydride per mole of epoxide, the larger the excess of anhydride, the greater the selectivity in forming the diester rather than the monoester. Of course, too large an excess of anhydride will require larger equipment and more effort on recovery of the unreacted excess anhydride and is therefore not usually desirable. To accelerate the reaction the presence of about 1 to 5 weight percent (based on anhydride) of an esterification catalyst is also desirable. For this purpose it has been found particularly advantageous to use a small amount of free perfluoroacid, preferably of the same species as the anhydride present, since this tends to produce good yields of products having relatively little contaminants present; also the use of such perfluoroacid simplifies the eventual recovery of the acid after preparation of the desired glycol from the ester.

However, while by no means fully equivalent, small amounts of other auxiliary acidic catalysts such as zinc chloride, aluminum chloride, hydrogen chloride, sulfuric acid, glacial acetic acid and the like may be used similarly along with the perfluoroanhydride, provided that the respective disadvantages incident thereto can be tolerated. For instance, catalysts such as zinc chloride and hydrogen chloride tend to produce considerably larger quantities of unsaturated monoesters along with the desired diester and they also tend to give a product which is relatively dark colored and contains somewhat unstable chloro-compounds which may gradually liberate hydrogen chloride.

The reaction between the epoxide and the perfluorocarboxylic anhydride can be carried out at temperatures ranging from 25° to 200° C. depending on the size of the ring and the extent of substitution in the ring. For instance, temperatures of about 75° to 150° C. are suitable for reacting trifluoroacetic anhydride with the more common 5- and 6-membered ring compounds. Lower temperatures will be sufficient for epoxides having a smaller ring, and higher temperatures will be best for the more complex, less reactive epoxides. High enough pressure is normally used so as to keep preferably at least a major portion of the reaction mixture in liquid phase. Accordingly, the pressure may range from 1 to 20 atmospheres. In cases where the reaction is too fast, or when some of the products or reactants are solids, inert solvents, such as ethyl or other aliphatic ethers, dioxane, or toluene, may be used.

After completion of the reaction the resulting ester may be isolated from the reaction mixture by distillation, preferably at a low enough pressure to allow recovery of the diesters as a distillate at temperatures below about 200° C. On the other hand, if the diester is relatively high boiling, it can be recovered in quite clean form as the distillation residue by distilling the unreacted reagents and monoester overhead. However, the diester may also be converted further without separation at this point, as will be illustrated later.

The diester either after separation or while still in the converted reaction mixture, may be converted to a glycol by alcoholysis with methanol or other $C_2$ to $C_3$ alcohols, preferably in the presence of a basic catalyst such as an alcoholate of an alkali metal e. g. potassium methoxide, quarternary ammonium bases such as trimethyl benzyl ammonium hydroxide, tetramethyl ammonium hydroxide, as well as basic ion exchange resins. Acid catalysts are not nearly so desirable since they tend to cause cyclization of the diester back to the epoxide. The low boiling alkyl fluoroester is then distilled off with or followed by any excess of the light alcohol, concentrating the higher boiling glycol in the still. The separated low boiling fluoroester such as methyl trifluoroacetate is readily hydrolyzed to the alcohol and perfluoroacid by refluxing in a stripping column with an excess of water. Thus, where trifluoroacetic acid is used, a water-trifluoroacetic acid azeotrope containing about 81 percent of acid boiling at 106° C. may be stripped from the hydrolyzed reaction mixture. The perfluoroacid can finally be recovered from the aqueous azeotropic solution by distilling it over sulfuric acid, or water may be removed by using a third component and distilling off as a low boiling ternary mixture. The perfluoroacid also may be recovered from the water solution by extraction with diethyl ether, for example, with which it forms a complex boiling at about 102° C. This complex can be readily broken up by adding a little water. Furthermore, instead of relying on alcoholysis, the diesters can be converted to glycols by saponification and, especially in the case of the more reactive compounds, even by hydrolysis.

The invention will now be further illustrated by specific examples. It will be noted that all amounts, proportions and percentages are expressed throughout on a weight basis unless otherwise indicated.

EXAMPLE 1

Fresh trifluoroacetic anhydride was prepared as follows. A one-liter glass still pot was charged with 313 grams (2.2 moles) of phosphorus pentoxide and 456 grams (4.0 moles) of trifluoroacetic acid, $CF_3COOH$. The pot was attached to a glass packed column and the mixture gently heated. The reflux temperature immediately rose to the boiling point of the anhydride, 39° C., and during the next four hours 285 grams (1.36 moles) of trifluoroacetic anhydride was collected as distillate. At this point the anhydride formation became slow and during the following eight hours only an additional 62 grams of anhydride was collected. The total amount of anhydride produced was 347 grams (1.65 moles) which represents a yield of 82.7% of the theoretical amount.

36.3 grams (0.36 mole) of 2,5-dimethyl tetrahydrofuran, $C_6H_{12}O$, was charged to a glass pressure flask fitted with a pressure gage and an inlet tube. Then 91.6 grams (0.44 mole) of trifluoroacetic anhydride $(CF_3CO)_2O$, and 2 ml. of free trifluoroacetic acid were added, the latter to serve as a catalyst. The flask and its contents were heated at 95° C. for a period of about 30 hours during which time the pressure gradually dropped from a maximum of about 70 to 17 p. s. i. g. Titration of a small sample of the product with standard base indicated that 65 percent of the epoxide had been converted up to this point.

The remaining product (126.5 grams) then was transferred to a side-arm distilling flask where it was distilled under a reduced pressure of 8 mm. Hg. In this manner the fractions described in Table I were obtained.

*Table I*

| Frac. No. | Weight, Grams | B. P. Range, ° C. at 8 mm. Hg | R. I., $n_D^{20}$ | Unreacted Anhydride in Fraction, Weight Percent | Sapon. Equiv. |
|---|---|---|---|---|---|
| 1 | 41.4 | collected in cold trap. | | | |
| 2 | 3.4 | 29 to 40 | [1] 1.3671 | 14.0 | |
| 3 | 6.0 | 40 to 50 | [1] 1.3681 | 16.4 | |
| 4 | 2.3 | 50 to 65 | [1] 1.3658 | 15.5 | |
| 5 | 65.1 | 77 to 80 | [1] 1.3668 | 0.9 | 156.7 |
| Residue | 8.3 | | | | |

[1] Anhydride free (anhydride was washed out of the fraction with water before determining the refractive index).

The material in fraction 1 consisted of unreacted dimethyl tetrahydrofuran and trifluoroacetic anhydride. The material in fractions 2, 3 and 4, on removing the anhydride present by washing with water was slightly unsaturated as shown by its bromine number. In general it appeared to be composed of an unsaturated ester. In particular, this ester appeared to be a hexene-5-ol-trifluoroacetate apparently corresponding to the formula $CF_3COO.CH(CH_3).CH_2.CH{:}CH.CH_3$. The material in fraction 5 and in the residue was the diester, hexane-2,5-diol-ditrifluoroacetate. This was indicated particularly by the experimental saponification equivalent of 156.7 which is in good agreement with the corresponding calculated value of 155. The yield of the diester amounted to 66 percent of the theoretical based on the epoxide charged.

49.4 grams (0.16 mole) of the diester was charged to the still of a small glass packed column together with a solution of sodium methylate in methanol. This solution was prepared by adding 0.7 gram of sodium metal to 38 grams (1.2 moles) of methanol. The mixture of diester, methanol and sodium methylate was heated to boiling and during the next seventy-five minutes 40 grams (0.31 mole) of methyl trifluoroacetate was collected as distillate. This distillate had a boiling point of 39° C., a refractive index $n_D^{20}$ of 1.2950, and was recovered in a yield corresponding to 97 percent of the theoretical amount. The contents of the still were then transferred to a small side-arm distilling flask, the excess methanol was removed under reduced pressure at about 100 mm. Hg and the diol was distilled at about 2 mm. Hg. In this manner 15 grams of 2,5-hexane-diol was obtained, corresponding to a yield equal to 80 percent of the theoretical amount. The diol was characterized by a boiling point of 103 to 105° C. at 2 mm. Hg, and a refractive index $n_D^{20}$ of 1.4464. The viscous distillation residue amounted to 6 grams and contained more of the diol, in addition to sodium alcoholate. The latter can be separated from the diol in the residue by water washing when the diol is relatively water insoluble.

EXAMPLE 2

In this example zinc chloride was used instead of free perfluoroacid as the auxiliary catalyst in the esterification reaction.

Accordingly, a mixture of 35.5 grams (0.36 mole) of 2,5-dimethyl tetrahydrofuran, 91.1 grams (0.43 mole) of trifluoroacetic anhydride and 1.0 gram of zinc chloride was heated at a temperature of about 95° C. in a glass pressure flask for a period of 17 hours at pressures ranging from 75 p. s. i. g. initially to 24 p. s. i. g. at the end. Titration of a sample at this point indicated a 74 percent conversion of the epoxide. The product was washed with five 25 ml. portions of water to remove unreacted anhydride, zinc chloride as well as most of the unreacted dimethyl tetrahydrofuran, which is somewhat water soluble. The washed product weighed 84.2 grams. Upon distillation from a small sidearm distilling flask at 8 mm. Hg pressure, this product gave the fractions described in Table II.

*Table II*

| Frac. No. | Weight, Grams | B. P. Range, ° C. at 8 mm. Hg | R. I., $n_D^{20}$ | Sapon. Equiv. |
|---|---|---|---|---|
| 1 | 11.6 | 36 to 70 | 1.3664 | |
| 2 | 59.4 | 76 to 77 | 1.3581 | 150.5 |
| Residue | 11.1 | above 77 | | 233 |

The material in fraction 1 from the above distillation appeared to consist mainly of the unsaturated monoester, though the presence of chlorine-containing material was also indicated by qualitative tests.

The material in fraction 2 consisted of the diester as shown by the saponification equivalent of 150.5, as against the calculated value of 155. The material in this fraction represented a diester yield of 54 percent of the theoretical, based on the dimethyl tetrahydrofuran charged. By comparison with Example 1 where a diester yield of 66 percent was obtained, it can be seen that zinc chloride, while effective, is not nearly so specific as the free fluoroacid in catalyzing the desired diester formation. On the contrary, the zinc chloride seemed to be responsible for an appreciable amount of side reactions, including some chlorination. Some of the chlorine from the zinc chloride apparently added to the double bond of the unsaturated monoester. Unlike the corresponding distillation residue in Example 1 which was quite fluid and consisted mainly of the diester, the distillation residue here was rather viscous as indicated by the following viscosity data:

| | |
|---|---|
| Viscosity, centistokes, at 210° F. | 4.004 |
| Viscosity, centistokes, at 100° F. | 44.32 |
| A. S. T. M. slope | 1.0 |
| Viscosity index, A. S. T. M. | —280 |

50 grams of the diester fraction separated above was subjected to substantially the same methanolysis as described in Example 1. Substantially the same yield and quality of 2,5-hexane-diol product was obtained.

EXAMPLE 3

This example serves to illustrate the advisability of having a catalyst present in the esterification reaction, and of operating under superatmospheric pressure. It also shows the advantage of converting the diester to the diol in an alkaline medium, as compared to an acid medium.

A mixture of 100 grams (1.0 mole) of 2,5-dimethyl tetrahydrofuran and 105 grams (0.5 mole) of fresh trifluoroacetic anhydride was allowed to reflux at a temperature of about 55° to 65° C. for a period of two hours. However, titration of a sample taken at this time showed that no reaction occurred. A 0.5 gram portion of zinc chloride was added to the above reactants and refluxing at atmospheric pressure was continued for an additional 19 hours. At the end of this period about 35 percent of the anhydride had reacted, as contrasted with more than twice that degree of conversion in the pressure runs described in Examples 1 and 2. The resulting mixture was transferred to a glass pressure flask and heating was continued at 95° C. for 15 more hours. In this step the reaction pressure ranged from about 25 p. s. i. g. initially to 0 at the end. At this point 68 percent of the anhydride had undergone reaction.

The diester was then isolated from the reaction mixture in the same manner as in Example 2. 50 grams of the separated diester was mixed with about 20 grams of methanol, and about 1 gram of hydrogen chloride gas was added as a catalyst for the alcoholysis. The mixture was heated until the theoretical amount of fluoroacetate was removed as distillate. Upon distillation, however, 2,5-dimethyl tetrahydrofuran was found in the distillate product in a yield equal to about 40 percent of the theoretical amount based on the diester charged, whereas the glycol fraction obtained in the distillation amounted to only about 60 percent of the theoretical. Moreover, this glycol product was contaminated with chloro-compounds which tended to decompose on standing to yield hydrogen chloride. In contrast, it will be noted from Examples 1 and 2 that when the alcoholysis is carried out in the presence of a basic catalyst, the glycol yield is quite substantially higher and the product quality is better.

It appears that acid catalysts cause cyclization of the diester, with resulting regeneration of the original epoxide.

EXAMPLE 4

In this example the epoxide was converted to the diol without isolating the intermediate diester.

For this purpose a mixture of 35.1 grams (0.35 mole) of 2,5-dimethyl tetrahydrofuran, 72.8 grams (0.35 mole) of trifluoroacetic anhydride, and 0.9 gram of zinc chloride was heated in a glass pressure flask for sixteen hours at a temperature of 95° C. In the course of this heating period the initial pressure of 75 p. s. i. g. dropped to 10 p. s. i. g. The conversion of the epoxide was 80.5 percent.

The entire reaction product was then transferred to the still of a small glass-packed column, 67 grams (2.1 moles) of methanol was added, a little hydrogen chloride was bubbled in, and the mixture was heated to boiling. During the next eight hours 86.7 grams (97 percent of the calculated amount based on total initial anhydride) of methyl trifluoroacetate was removed as distillate. This ester distillate had a boiling point of 39° C. and a refractive index of 1.2950. The residue was transferred to a small side-arm distilling flask and distilled under reduced pressure. After stripping off a small amount of light ends present 17.6 grams of product was obtained which boiled from 50° to 102° C. at 8 mm. Hg. The material consisted chiefly of a mixture composed predominantly of hexane-diol and a minor amount of the unsaturated hexenol.

However, the material was rather dark in color and also contained some choloro-compounds which decomposed during the distillation with liberation of hydrogen chloride. It is apparent that it is entirely feasible to prepare diols from epoxides without separation of the intermediate diesters. But as in Example 3, the data show that acidic and chlorine containing catalysts are not the most advantageous in this type of reaction.

In contrast, when this "one-step" reaction is carried out using free acid as catalyst in the esterification and a basic catalyst such as potassium alcoholate in the alcoholysis, almost as good results can be obtained without intermediate separation of the diester as when such diesters are separated prior to the alcoholysis.

Having described the general nature as well as illustrative examples of the invention, it will be understood that the actual scope of the invention is particularly pointed out in the appended claims.

What is claimed is:

1. A process for preparing diesters of glycols from an epoxide having the formula

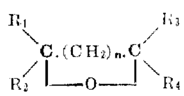

wherein $n$ is an integer from 0 to 3 and $R_1$, $R_2$, $R_3$ and $R_4$ are members of the group consisting of hydrogen, halogen, carboxylic acid, carbalkoxy and alkyl radicals of 1 to 15 carbon atoms, which process comprises mixing said epoxide with at least an equimolar quantity of an anhydride of an aliphatic perfluorocarboxylic acid of 2 to 6 carbon atoms per molecule and maintaining the mixture at a reaction temperature between 75° to 150° C. until a glycol diester is produced.

2. A process according to claim 1 wherein the perfluorocarboxylic acid is one containing 2 to 4 carbon atoms per molecule, and the reaction mixture further contains a small amount of an acidic esterification catalyst.

3. A process according to claim 2 wherein the reaction mixture contains a catalytic amount of zinc chloride to promote the esterification reaction.

4. A process for preparing diesters of glycols from an alkyl substituted epoxide having an alkylene oxide ring of 4 to 5 carbon atoms and not more than three alkyl substituents of 1 to 3 carbon atoms each, which process comdimethyl-tetrahydrofuran with about 1.5 to 2 mole equivlents of an anhydride of a perfluoroaliphatic monocarboxylic acid having 2 to 6 caron atoms per molecule and about 1 to 5 weight percent (based on the anhydride) of a free acid of the same genus as the said anhydride and heating the mixture at a temperature between 25° and 200° C.

5. A process according to claim 4 wherein the perfluorocarboxylic anhydride contains 2 to 4 carbon atoms per molecule, the free perfluoroacid is of the same species as said anhydride, and the reaction is carried out at a pressure of about 10 to 100 p. s. i. g., and a temperature between 75° and 150° C.

6. A process for preparing hexane-2,5-diol-ditrifluoroacetate which comprises mixing 1 mole equivalent of 2,5-dimethyltetrahydrofuran with about 1.5 to 2 mole equivalents of trifluoroacetic anhydride and about 1 to 5 weight percent of trifluoroacetic acid based on the anhydride, heating the mixture at a temperature of about 75 to 150° C. and an initial pressure of about 50 to 100 p. s. i. g. until about 50 to 95 percent of the dimethyl tetrahydrofuran is converted, and separating the resulting hexane-2,5-diol-ditrifluoroacetate from the mixture.

7. A process for the synthesis of of glycols which comprises mixing an epoxide selected from the group consisting of 2-alkyl-tetrahydrofurans and 2,5-dialkyl tetrahydrofurans having 5 to 16 carbon atoms per molecule with a molecular excess of a perfluoroacid anhydride having the formula $(C_nF_{2n+1}CO)_2O$ wherein $n$ is an integer ranging from 1 to 3 and a small amount of free perfluoroacid of the same species as said anhydride, maintaining the mixture at a temperature of about 25 to 200° C. and a pressure of about 1 to 20 atmospheres until at least 50% of the epoxide is converted to the corresponding diester, mixing the diester with at least two moles of an alkanol of 1 to 3 carbon atoms per mole of diester, also adding to the mixture a basic alcoholysis catalyst, heating the mixture to convert the diester to a diol and an alkyl monoester, and separating the resulting diol therefrom by distillation.

References Cited in the file of this patent

UNITED STATES PATENTS

| | | |
|---|---|---|
| 2,525,530 | Dickey et al. | Oct. 10, 1950 |
| 2,592,069 | Reid | Apr. 8, 1952 |
| 2,634,290 | Sonia et al. | Apr. 7, 1953 |
| 2,685,599 | Dickey et al. | Aug. 3, 1954 |

FOREIGN PATENTS

| | | |
|---|---|---|
| 589,197 | Great Britain | June 13, 1947 |

OTHER REFERENCES

Hill et al.: J. Am. Chem. Soc. 60 (1938) 1033–5.

Paul: Chem. Abst. 33 (1939) 4192.

U. S. DEPARTMENT OF COMMERCE

PATENT OFFICE

CERTIFICATE OF CORRECTION

Patent No. 2,802,023 August 6, 1957

Merrell R. Fenske et al.

It is hereby certified that error appears in the printed specification of the above numbered patent requiring correction and that the said Letters Patent should read as corrected below.

Column 7, lines 47 to 50, strike out "com- dimethyl-tetrahydrofuran with about 1.5 to 2 mole equivlents of an anhydride of a perfluoroaliphatic monocarboxylic acid having 2 to 6 caron atoms per molecule" and insert instead -- comprises mixing the epoxide with about 1.5 to 2 mole equivalents of an anhydride of a perfluoroaliphatic monocarboxylic acid having 2 to 6 carbon atoms per molecule --.

Signed and sealed this 25th day of March 1958.

(SEAL)
Attest:

KARL H. AXLINE

Attesting Officer

ROBERT C. WATSON
Commissioner of Patents